July 23, 1940.                S. R. SMITH                2,208,861
                              BAIT BUCKET
                          Filed Aug. 25, 1938
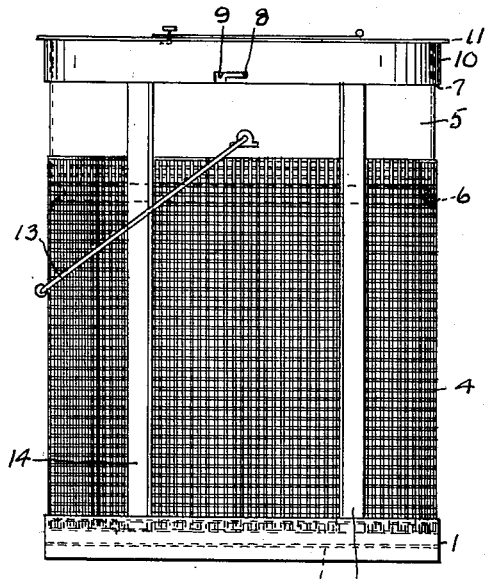
Fig. 1.
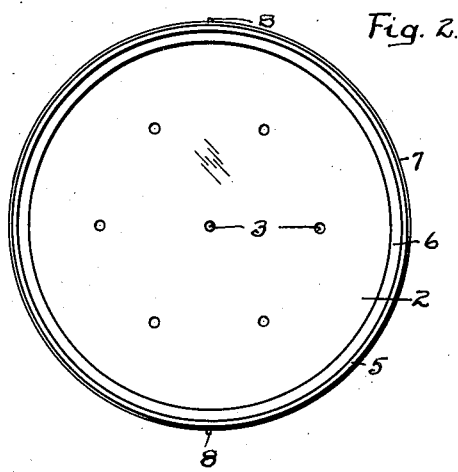
Fig. 2.
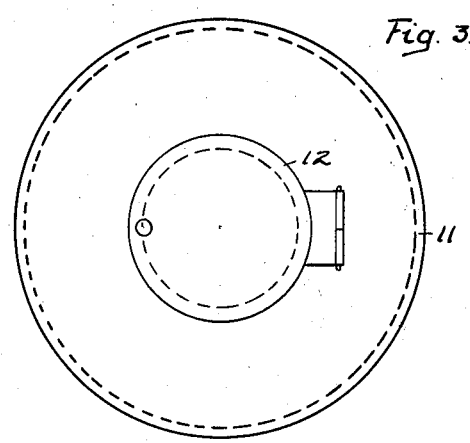
Fig. 3.
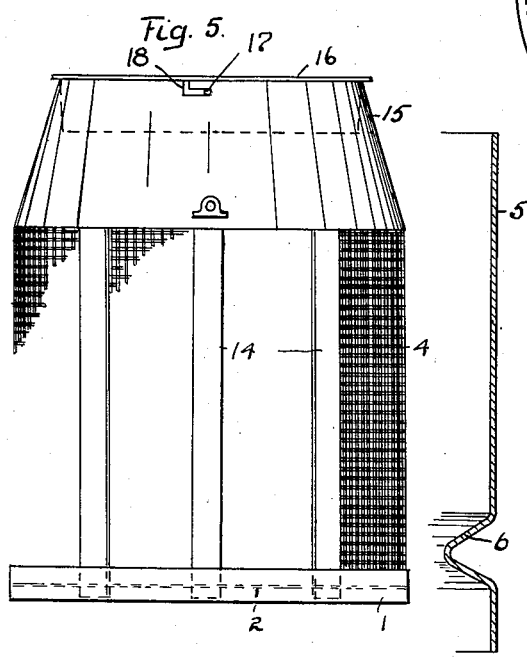
Fig. 5.
Fig. 4.
S. R. Smith
INVENTOR.
BY Elwin M. Hulse
ATTORNEY.

Patented July 23, 1940

2,208,861

UNITED STATES PATENT OFFICE 2,208,861

BAIT BUCKET

Silas Roscoe Smith, Pendleton, Ind., assignor of one-half to C. Glenn Greek, Fort Wayne, Ind.

Application August 25, 1938, Serial No. 226,737

3 Claims. (Cl. 43—56)

The invention relates to bait buckets for housing live insects in readiness for use as bait by fishermen.

In many localities fishermen use live crickets, and the like as bait for certain types of fishing. The difficulty with such bait is to keep the supply alive while fishing and to prevent their escape from the receptacle containing them.

The object of my invention is to provide a novel, simple receptacle in which live bait such as crickets and the like may be housed and from which the bait cannot escape either when placed in storage or when it is opened in use while fishing.

The invention is illustrated in the accompanying drawing in which:

Figure 1 is an elevation of a receptacle embodying the invention.

Fig. 2 is a plan view with the cover removed.

Fig. 3 is a plan view of the cover.

Fig. 4 is an enlarged cross-section of the band and

Fig. 5 is an elevation of a modified form of the invention.

Referring to the illustrative drawing, the receptacle comprises an annular base 1 carrying the bottom 2 which is perforated at 3 to furnish drainage. An annular, perforated wall such as the wire screen 4 of suitable mesh is secured to the base and to the outer surface of an annular band 5 of smooth or polished metal having an annular bead 6 formed on its inner face near its lower edge. A collar 7 surrounds the upper end of the band and carries the laterally projecting pins 8 which are adapted to be received by the bayonet slots 9 formed in the skirt or depending annular flange 10 of the cover 11. An opening in the cover is adapted to be closed by the lid 12 that is hinged to the cover.

A bail 13 is suitably mounted on the receptacle, as on the band 5.

In order to reinforce the receptacle I attach the strips 14 to the base 1 and to the band 5 or the collar 7, the screen also being secured to the strips if desirable. Where the screen material is of sufficient strength the reinforcing strips may be omitted.

When the device is in use to house crickets while fishing, the cover may be removed. The crickets will climb up the screen wall but they cannot crawl up the band since it is smooth or polished and they cannot cling to such surface. The only way they can escape is to jump through the open top. The bead 6 will prevent a cricket from jumping out of the receptacle. If a cricket has reached the lower edge of the band and it attempts to jump upwardly, the bead will cause it to take a diagonal path, and this direction plus the pull of gravity will usually end the jump short of the top. It will have less chance of escaping the lower down on the screen it is when it jumps as it is also facing the wall and in jumping, it will push itself away from the screen and toward the center of the receptacle.

Food, of course, is placed in the receptacle, but not to a depth that will permit the insect to jump out without touching the band 5.

When the cover is on the receptacle, as in case of rough weather or when fishing from a sloping bank, the lid 12 is opened. The opening closed by the lid is large enough to permit the insertion of the hand to remove an insect. The insects cannot escape unless the food in the receptacle is too deep. The bead keeps the insects below the band and low enough in the receptacle so that they may be readily seen through the opening in the cover. If the receptacle is accidentally upset and quickly righted, very few if any of the insects will escape as they cannot cling to the smooth band.

Since the screen forms a large portion of the wall of the receptacle thorough ventilation is assured and suffocation of the insects is practically eliminated. The mesh of the screen should not be too fine, otherwise a cricket might catch its legs in the small openings and break them off, and the mesh should not be large enough to permit a cricket to escape through the screen. The smooth band should be high enough to present a substantially smooth surface in the upper portion of the receptacle. I have found that where the band is approximately four inches in depth and the screen is one-eighth inch to one quarter inch mesh, the device is very efficient.

In Fig. 5 the smooth band 15, corresponding in function to the band 5, is conical in shape. In this modification the bayonet slots 18 are formed in the band 15 and the cover 16 fits within the band and is provided with the locking pins 17.

What I claim is:

1. A live bait receptacle comprising an annular bottom, an annular wall supported by the bottom and formed of meshed material, a smooth metal band secured to the upper portion of the meshed material and projecting upwardly therefrom, and a bead on the inner wall of the band adjacent to the lower end thereof.

2. A cricket bucket comprising an annular bottom, a perforated wall secured to the periphery of the bottom, a polished band secured to the upper portion of the inner face of the perforated wall, the band having an inwardly projecting bead adjacent to the lower edge thereof, and a cover mounted on the band.

3. A live bait receptacle comprising a base, an upright apertured side wall supported on the base and extending about its margin, an imperforate smooth wall attached to the inner face of the upper portion of the perforated wall and co-extensive therewith, and an inwardly projecting member on the lower portion of the smooth wall and extending around the same.

SILAS ROSCOE SMITH.